(12) United States Patent
Sato et al.

(10) Patent No.: US 8,743,668 B2
(45) Date of Patent: Jun. 3, 2014

(54) OBJECTIVE LENS DRIVE DEVICE AND OPTICAL PICKUP

(75) Inventors: Yoshihiro Sato, Yokohama (JP); Hidenao Saito, Yokohama (JP); Jun Hato, Fujisawa (JP); Ryuichiro Mizuno, Fujisawa (JP); Katsuhiko Kimura, Kasumigaura (JP); Seiichi Kato, Tsuchiura (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/967,104

(22) Filed: Dec. 14, 2010

(65) Prior Publication Data

US 2011/0149713 A1   Jun. 23, 2011

(30) Foreign Application Priority Data

Dec. 18, 2009   (JP) ................................. 2009-287494

(51) Int. Cl.
*G11B 7/00*   (2006.01)

(52) U.S. Cl.
USPC ..................................... 369/44.14

(58) Field of Classification Search
USPC ...................... 369/44.11, 44.21, 44.14, 44.15
See application file for complete search history.

(56) References Cited

U.S. PATENT DOCUMENTS

| | | | | |
|---|---|---|---|---|
| 7,289,417 B2 * | 10/2007 | Kim et al. | ................ | 369/112.24 |
| 7,394,732 B2 * | 7/2008 | Ikeda et al. | ................ | 369/44.15 |
| 7,593,294 B2 * | 9/2009 | Nogami | ..................... | 369/44.14 |
| 7,636,279 B2 * | 12/2009 | Nishioka et al. | ........... | 369/44.14 |
| 7,791,985 B2 * | 9/2010 | Iijima et al. | ................ | 369/44.15 |
| 2006/0083121 A1 | 4/2006 | Kimura et al. | | |
| 2007/0079317 A1 | 4/2007 | Kimura et al. | | |

FOREIGN PATENT DOCUMENTS

| | | |
|---|---|---|
| JP | 2-96932 | 4/1990 |
| JP | 7-244861 | 9/1995 |
| JP | 2005-129191 | 5/2005 |
| JP | 2006-120205 | 5/2006 |

OTHER PUBLICATIONS

Office Action in JP 2009-287494, dispatched Aug. 21, 2012 (1 pg., in Japanese; English language translation (3 pgs.).

* cited by examiner

*Primary Examiner* — Nabil Hindi
(74) *Attorney, Agent, or Firm* — Antonelli, Terry, Stout & Kraus, LLP.

(57) ABSTRACT

In an optical pickup equipped with a semiconductor laser, electro-optical components such as a lens, and an objective lens drive device, the objective lens drive device includes objective lenses, a holder holding the objective lenses, a focusing coil, and tracking coils. The focusing coil is wound in parallel to the optical surface of the objective lens, and formed in a parallelogram shape having inclined portions provided near the tracking coils. The two tracking coils are placed on diagonal portions of the lens holder.

16 Claims, 11 Drawing Sheets

A-ARROW VIEW

OBJECTIVE LENS DRIVE DEVICE AND OPTICAL PICKUP

BACKGROUND OF THE INVENTION (i) Field of the Invention

This invention relates to an optical pickup which records/reproduces data on/from a disc loaded in an optical disc device or the like, and an objective lens drive device including the optical pickup.

(ii) Description of the Related Art

A structure of optical disc devices will be described below.

An optical disc device includes a spindle motor for rotating an optical disc, an optical pickup for recording/reproducing information on/from the optical disc, and a sledge mechanism for moving the optical pickup in the radial direction of the optical disc. The optical disc device further includes control circuits individually controlling the sledge mechanism and a controller comprehensively controlling a reproduction signal from the optical disc or a record signal to the optical disc. One of the mechanisms which directly records/reproduces information on/from the optical disc is the optical pickup.

The operation of the optical disc device based on the optical pickup is described.

To read/write on the optical disc, a laser is emitted from the optical pickup onto the optical disc loaded in the optical disc device, and then is subjected to focus control of bringing a spot of the laser into focus on the data surface of the optical disc. Then, the disc is rotated for data track alignment to be similarly subjected to track control.

In this manner, the information on the optical disc is electrically converted to optical information through the optical pickup, which is then transmitted as data to the controller of the optical disc device. The optical disc device receives signals from the optical pickup in this manner and transmits/receives data to/from a personal computer or the like.

In recent years, the recording density of optical discs has been progressively increased. This has been realized mainly by shortening the laser wavelength. On the other hand, since the optical disc devices are used in personal computers and the like and development and popularity of the notebook type of personal computer has been accelerated, a reduction in thickness of the optical disc device is required.

In turn, a reduction in thickness of an optical pickup used in the optical disc device is absolutely necessary. Since an optical pickup supporting high density discs has wavelength incompatibility with a conventional scheme, two objective lenses are mounted on an object lens drive device. A reduction in thickness of the optical pickup must be implemented with this structure.

For driving an object lens, a magnetic propulsion force is generated at a coil mounted on a movable section of the objective lens drive device by magnetic action of the coil and a magnet mounted on a stationary section located opposite to the coil. The magnetic propulsion force serves as a force that drives the objective lens to follow the wobble of a data track during the rotation of the optical disc. A wobbling direction of the data-track wobble is mainly the out-of-plane direction of the optical disc, that is, a focusing direction, and the radial direction of the optical disc, that is, a tracking direction. Because of this, the objective lens drive device is equipped with a focusing coil and a tracking coil in the movable section.

JP-A No. 2005-129191 (page 14, FIG. 1) discloses an example of such objective lens drive devices. The objective lens drive device disclosed in JP-A No. 2005-129191 includes a drive coil comprising a focusing coil wound around an objective lens holder, a tracking coil attached to the surface of the focusing coil, and a magnet disposed such that a magnetic field is induced on the surface opposite to the tracking coil.

JP-A No. 2006-120205 (FIG. 1) provides a low-profile optical pickup structured such that focusing and tracking coils are arranged on the right and left sides of an objective lens.

JP-A No. 2005-129191 relates to a magnetic circuit configuration in an objective lens drive device of an optical pickup, and particularly describes a coil configuration. For an optical pickup for a half-height type (device height is about 45 mm), the size of a magnet can be increased in accordance with a size of the optical pickup. This makes it possible to generate a necessary sufficient magnetic propulsion force at each of the focusing and tracking coils.

However, achievement of both low-profile styling and placement of two objective lenses requires a reduction in size of the magnet. In step with this, the coil must be reduced in size. As a result, a sufficient magnetic propulsion force is generated at the coil with difficulties.

JP-A No. 2006-120205 describes an ultra-thin pickup which is equipped with one objective lens. The objective lens is placed at a center of the objective lens holder. Therefore, the focusing coil and the tracking coils can be arranged on the right and left sides of the objective lens.

However, in the case of mounting two objective lenses, if the two objective lenses are placed in an objective lens holder with the same dimensions as the above-described one, symmetric arrangement of the focusing coil and the tracking coils is made impossible. Also, an increased number of objective lenses leads to an increases in weight, which in turn causes a reduction in acceleration sensitivity of the objective lens drive device. Further, in recent years, optical discs have been used as a distribution medium of a published book. The stacked books or the like apply pressure to the optical discs, so that the optical discs may be deformed, in particular, in the out-of-plane direction. If information is reproduced or the like from such a deformed optical disc, displacement occurs, particularly, in the focusing direction. Because of this, the acceleration sensitivity in the focusing direction is required to be increased. Considering this circumstance, in the configurations of JP-A No. 2005-129191 and JP-A No. 2006-120205, insufficient acceleration sensitivity is pronounced.

Accordingly, it is necessary to study a structure of an objective lens drive device of an optical pickup which is adapted to an ultra-thin type of optical pickup equipped with two objective lenses and makes the faster performance of optical discs feasible.

SUMMARY OF THE INVENTION

The present invention has been made in view of the above circumstances and provides an optical pickup adapted to high-density optical discs and providing for a reduction in thickness and faster multi-speed.

The present invention provides an objective lens drive device, comprising: objective lenses guiding light emitted from a light emitting element to a disc surface; a holder in which the objective lenses are mounted; a focusing coil wound around the holder; a tracking coil attached in the vicinity of the focusing coil; and magnets for operating the focusing coil and the tracking coil. In the objective lens drive device, spaces are provided in the focusing coil for placing the tracking coils.

The foregoing feature and other features according to the present invention will be further described in the following.

According to the present invention, since shortening of the distance between a focusing coil and a magnet is possible, an objective lens drive device with enhanced acceleration sensitivity in the focusing direction is provided.

BRIEF DESCRIPTION OF THE DRAWINGS

Embodiments of the present invention will be described in detail based on the following drawings, wherein.

DETAILED DESCRIPTION OF THE INVENTION

Before describing exemplary embodiments according to the present invention, a related-art objective lens drive device is described with reference to FIG. 11.

Figure 11:
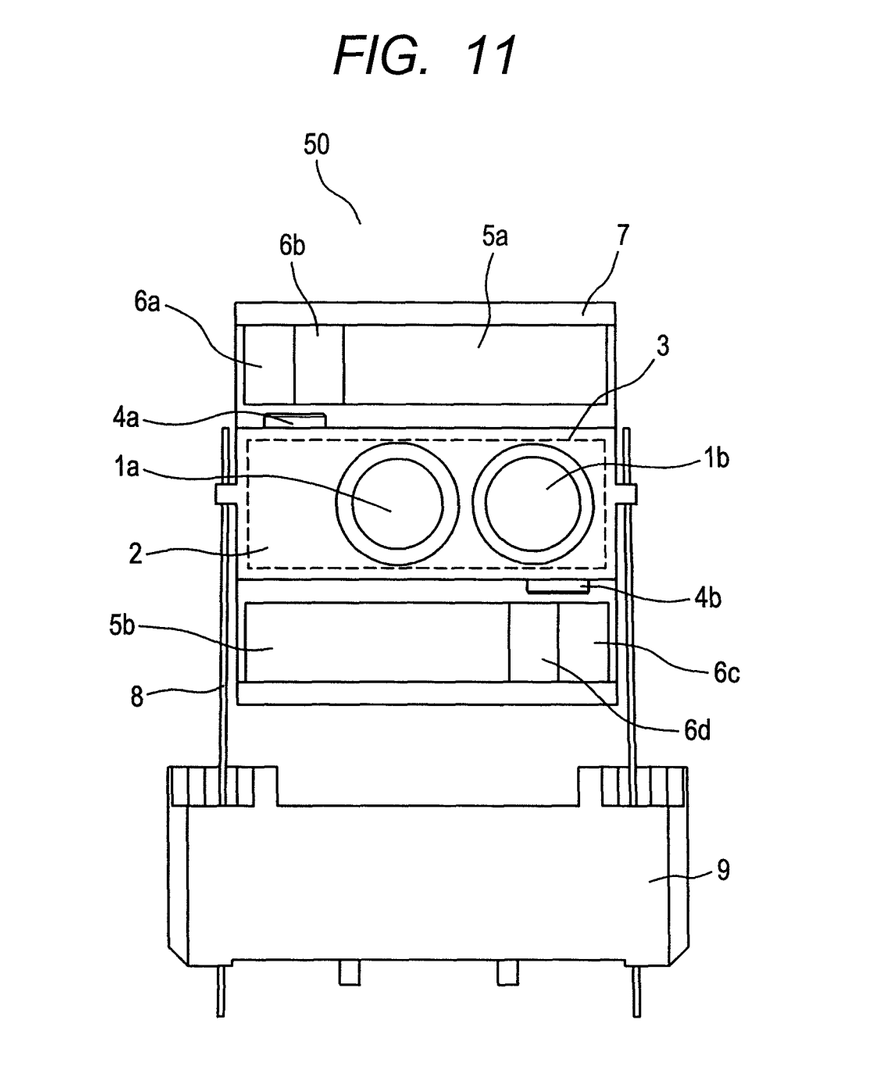
FIG. 11 is a top view of a related-art objective lens drive device.

FIG. 11 is a top view of a related-art objective lens drive device.

In FIG. 11, objective lenses 1a, 1b are placed in a holder 2. The holder 2 is designed to receive a magnetic drive force by magnets 5a, 5b, 6a, 6b, 6c, 6d and coils 3, 4a, 4b. As the objective lenses 1a, 1b, two objective lenses are employed in order to be adapted to a high-density optical disc and a conventional optical disc.

Therefore, the objective-lens holder 2 has a laser-beam passage indentation 20 (described in detail in FIG. 3) used for the two objective lenses 1a, 1b and provided for directing beams respectively emitted from lasers toward the objective lenses 1a, 1b with reliability when the objective lens drive device is mounted as an objective lens drive device 50 on an optical pickup 60.

The coils 3, 4a, 4b are a focusing coil 3 (shown by the dotted line in FIG. 11) intended for following out-of-plane vibration of the data surface of an optical disc (not shown), and tracking coils 4a, 4b intended for following in-plane vibration of the data surface of the optical disc.

Since the two objective lenses 1a, 1b are paired and respectively intended for BD (for Blu-ray Disc) and for CD, DVD as described earlier, the weight of the pickup is heavier than the case of common use of a single objective lens for CD and DVD. As a result, A BD optical pickup using a pair of two objective lenses gives rise to impaired acceleration sensitivity in the focusing direction.

A possible means for addressing this problem is a reduction in thickness of the holder 2 holding the objective lenses in order to reduce the weight. However, it has been found that a reduction in thickness of the holder is finite in terms of strength and therefore there is a limit to a reduction in weight for improving the acceleration sensitivity in the focusing direction.

To address this, the inventors of the present invention have found that the distance between the focusing coil 3 shown by the dotted line and the magnets 6a, 6b, 5a, and likewise, the distance between the focusing coil 3 and the magnets 5b, 6d, 6c, as shown in FIG. 11, are decreased to increase the magnetic force on the focusing coil 3. However, the tracking coils 4a, 4b are located in positions where they obstruct a reduction in the distance between the magnets 6a, 6b, 5a and the focusing coil 3 and between the magnets 5b, 6d, 6c and the focusing coil 3. To address this, the inventors of the present invention have conceived a focusing coil 3 provided with changed-level stages for holding the tracking coils 4a, 4b.

For information, a typical size of a focusing coil 3 is a rectangular shape of about 10 mm by about 4 mm.

Embodiments according to the present invention will be described below with reference to the accompanying drawings.

First Embodiment

Figure 1:
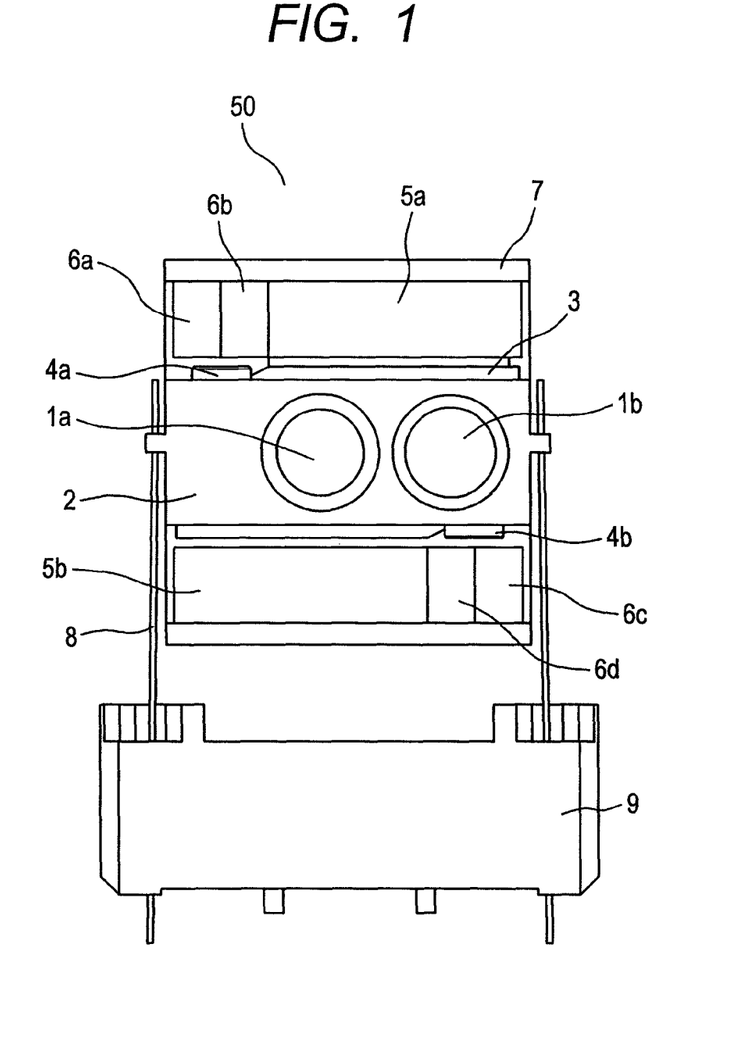
FIG. 1 is a top view illustrating a first embodiment according to the present invention.

FIG. 1 is a top view of an objective lens drive device according to a first embodiment.

Figure 2:
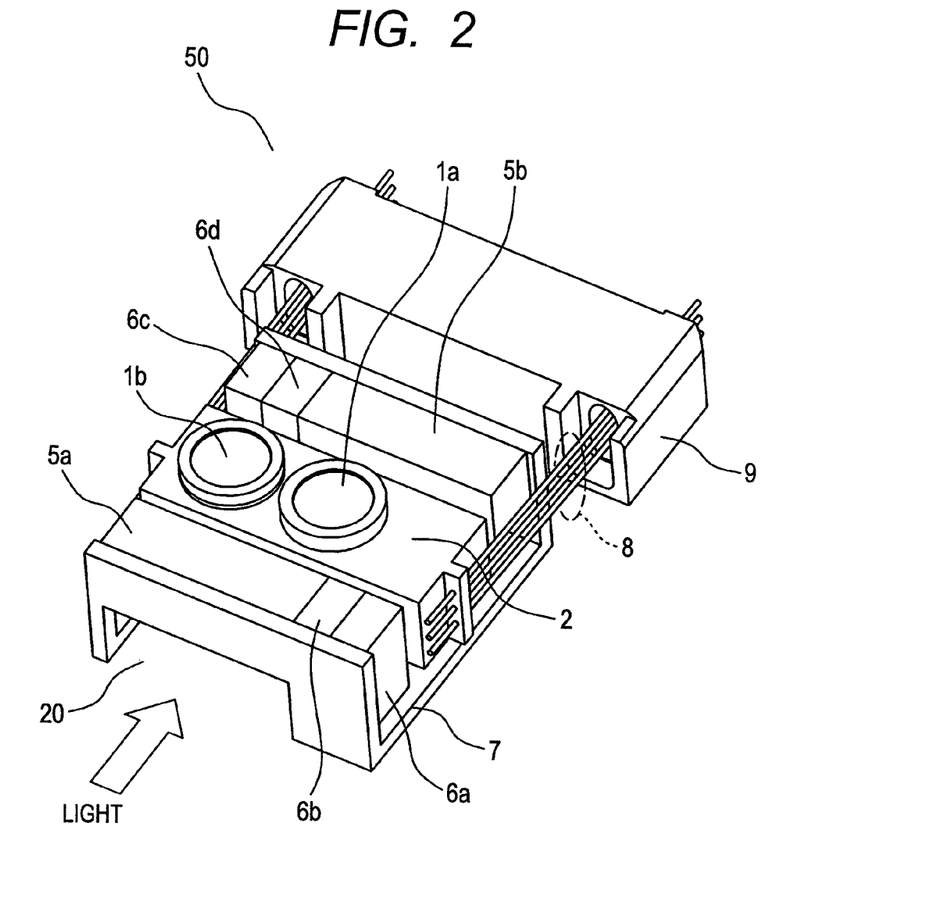
FIG. 2 is a perspective view illustrating the first embodiment according to the present invention.

FIG. 2 is a perspective view of the first embodiment.

Figure 3:
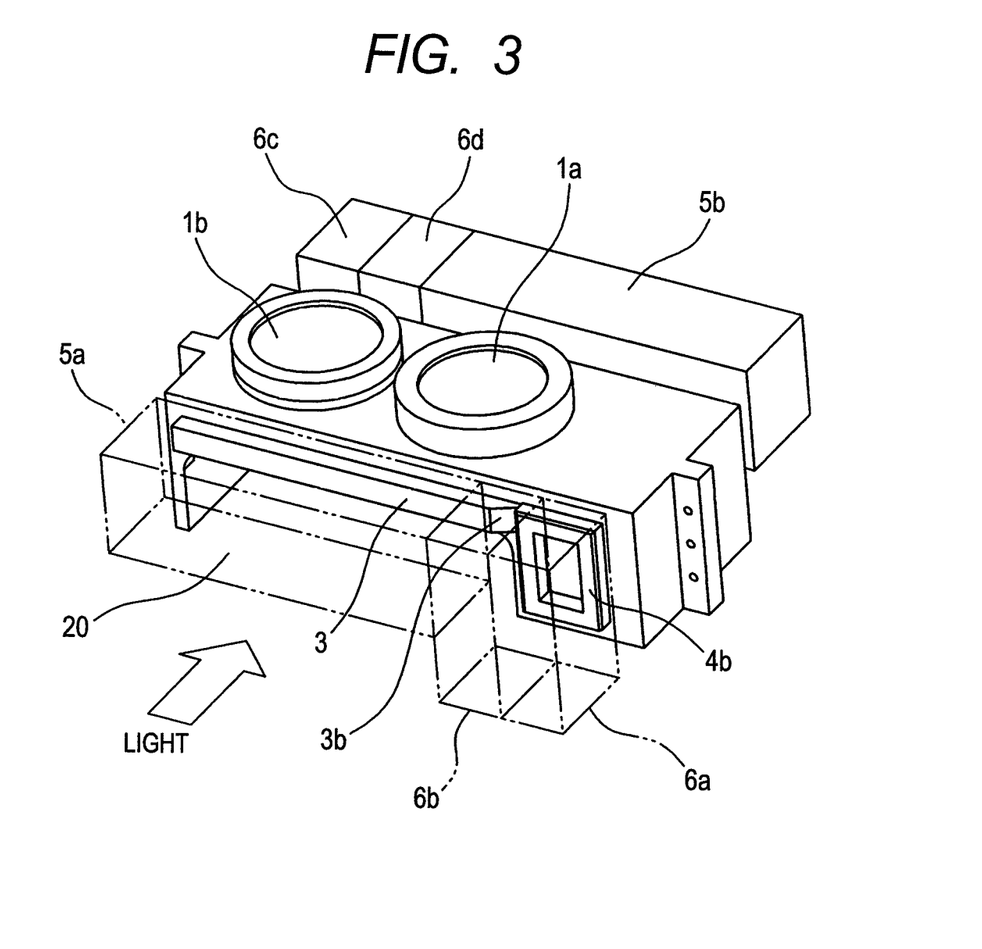
FIG. 3 is a perspective view of a movable section and a transparently-shown magnetic circuit according to the first embodiment of the present invention.

FIG. 3 is a perspective view of a movable section and a transparently-shown magnetic circuit.

Figure 4A:
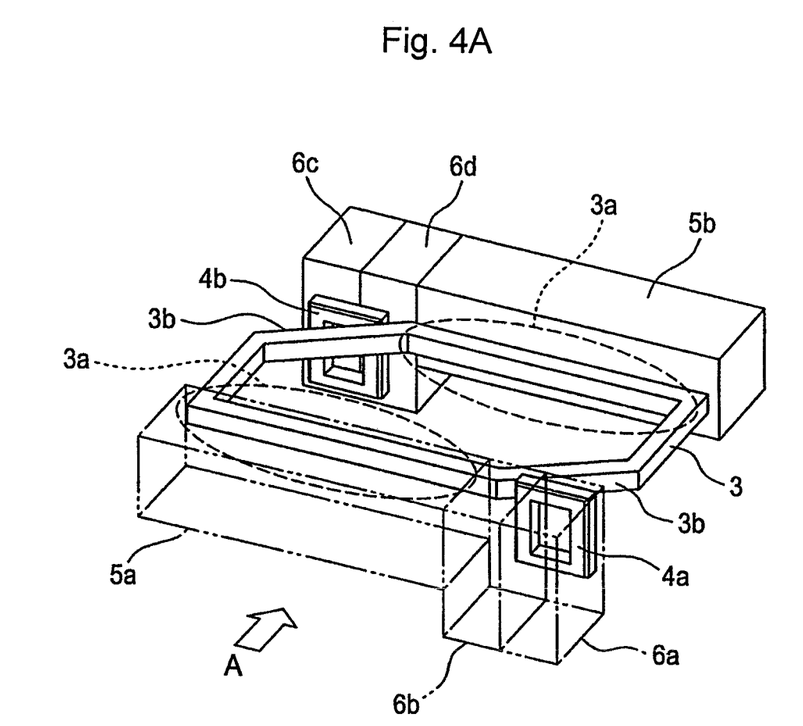
FIG. 4A is a perspective view illustrating a positional relationship between magnets and coils according to the first embodiment of the present invention.
Figure 4B:
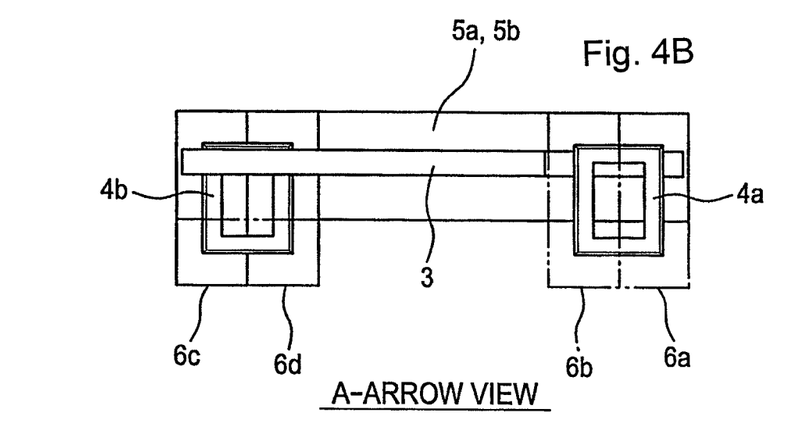
FIG. 4B is a front view illustrating the positional relationship between the magnets and the coils according to the first embodiment of the present invention.

FIGS. 4A, 4B are a perspective view and a front view that illustrate a positional relationship between magnets and coils.

Figure 5:
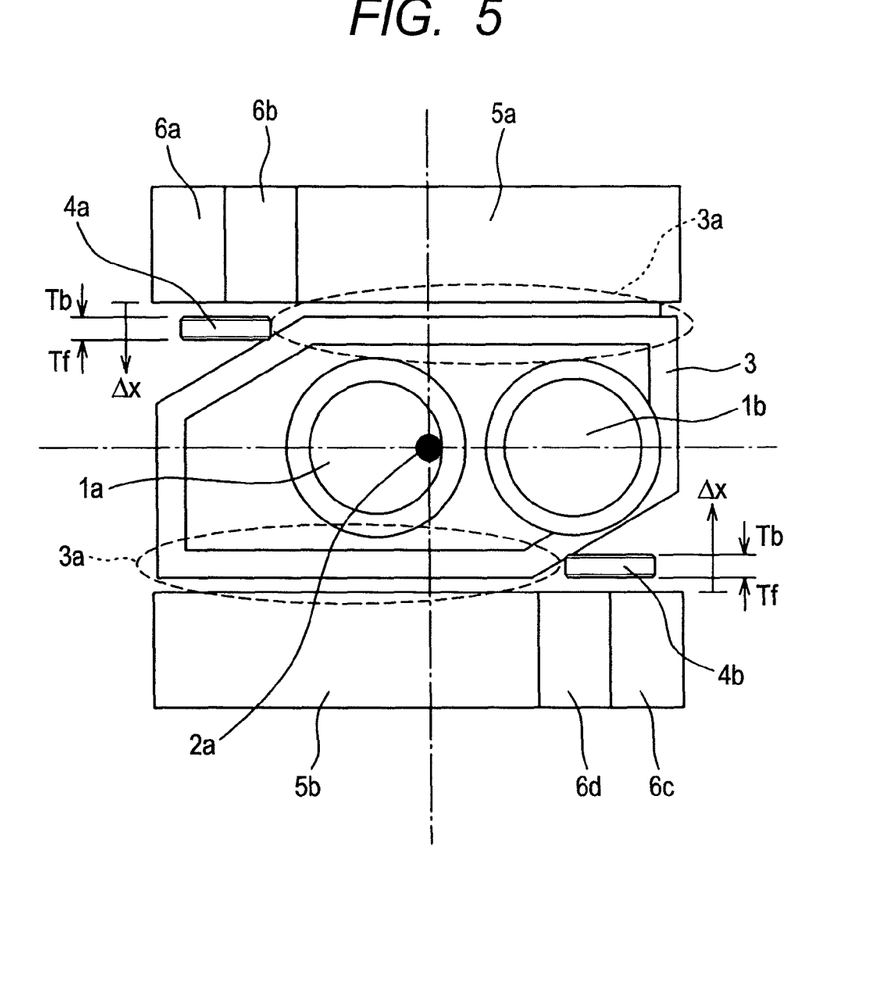
FIG. 5 is a diagram illustrating a distance relationship between a magnet and a focusing coil according to the first embodiment of the present invention.

FIG. 5 is a diagram illustrating a distance relationship between a magnet and a focusing coil or a tracking coil.

Figure 6:
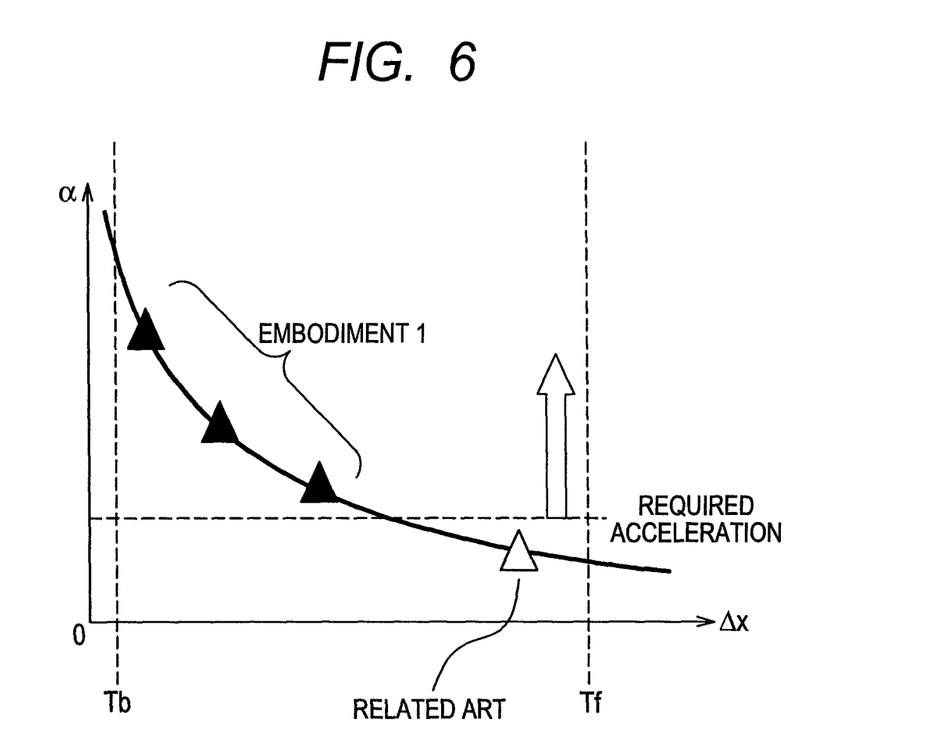
FIG. 6 is a graph showing a relationship between acceleration sensitivity in a focusing direction and a gap between the a magnet and a focusing coil when the gap is varied, according to the first embodiment of the present invention.

FIG. 6 is a graph showing a relationship between acceleration sensitivity or magnetic propulsion in a focusing direction and a gap between a magnet and a focusing coil when the gap is varied.

A feature of the first embodiment is configuration in which the magnet-facing face of the focusing coil 3 is located within a range corresponding to the thickness of the tracking coil 4a, 4b in the direction of the gap between the tracking coil and the magnet. The first embodiment will be described below.

In each of the drawings, the objective lenses 1a, 1b are mounted in the objective lens holder 2. The objective lens holder 2 is operated upon reception of a magnetic drive force by the magnets 5a, 5b, 6a, 6b, 6c, 6d and the focusing coil 3 and the tracking coils 4a, 4b. As the objective lenses 1a, 1b, two objective lenses are employed in order to be adapted to a high-density optical disc and a conventional optical disc.

The objective-lens holder 2 has a laser-beam passage indentation 20 used for the two objective lenses and provided for directing beams emitted respectively from lasers toward the objective lenses 1a, 1b with reliability when the objective lens drive device 50 is mounted on the optical pickup 60.

The focusing coil 3 and the tracking coils 4a, 4b are also provided in the objective lens holder 2. A tilt coil (not shown) may be mounted for following warping of an optical disc in the radial direction.

Since the movable section including the objective lenses 1a, 1b which is structured in this manner is elastically supported, the movable section is secured to a separately-provided stationary section 9 by use of wires 8. The wire 8 is formed in a straight beam shape in FIG. 1, but may be a crank shape or a shape with a spring middle. The stationary section 9 to which the wires 8 are secured may be provided with a damping material or the like in order to provide appropriate damping to the movable section including the objective lenses 1a, 1b from vibration viewpoint. In order to provide a magnetic propulsion force to the coils 3 and 4a, 4b placed on the movable section including the objective lenses 1a, 1b, the magnets 5a, 5b and the magnets 6a, 6b, 6c, 6d are placed on the surfaces facing the coils 3 and 4a, 4b. The magnets 5a, 5b and 6a, 6b, 6c, 6d are secured to a yoke 7 in order for the magnets 5a, 5b and 6a, 6b, 6c, 6d to provide appropriate magnetic flux distribution for the coils 3 and 4a, 4b and in order to fix the magnets 5a, 5b and 6a, 6b, 6c, 6d.

Next, the coil shape and the magnet placement, which are characteristic configuration according to the first embodiment, will be described.

As illustrated in FIGS. 3, 4, the tracking coils 4a, 4b are placed within the projection planes of the magnets 6a, 6b and 6c, 6d when viewed from the laser incidence side for the purpose of avoiding the laser-beam passage indentation 20. The tracking coils 4a, 4b are attached point-symmetrically with respect to the geometric center of the objective lens holder 2 as a pair of coils.

The focusing coil 3 is wound around the objective lens holder 2. Also, the focusing coil 3 has changed-level stages 3b formed as inclined portions for placing the tracking coils 4a, 4b in the vicinity to the mounting position of the tracking coils 4a, 4b.

As shown in FIGS. 3, 4, a magnetic-propulsion effective range 3a of the focusing coil 3 is part of the focusing coil 3 extending parallel to the magnet surface. The focusing coil 3 is shaped to keep away from the laser-beam passage indentation 20 for the objective lenses 1a, 1b.

As illustrated in FIG. 5, the magnet-facing plane of the magnetic-propulsion effective region 3a of the focusing coil 3 is placed within a range of a thickness Tf-Tb of each of the tracking coils 4a, 4b. Tf represents a position of the magnet side of the tracking coil, while Tb represents a position of attaching the tracking coil. If the magnet-facing plane of the magnetic-propulsion effective region 3a of the focusing coil 3 protrudes beyond the magnet-side position of the tracking coil toward the magnet, individual coil-to-magnet contact is likely to occur. To avoid this, the magnet-facing plane is desirably located closer to the objective lenses 1a, 1b than the position Tf is located.

In a similar manner to the placement of the tracking coils 4a, 4b, the magnets 6a, 6b, 6c, 6d are placed opposite to the tracking coils 4a, 4b. Specifically, the magnets for the tracking coils 4a, 4b exist in point-symmetric positions with respect to the geometric center 2a of the objective lens holder 2. Also, each of the magnets has as large size in the focusing direction as possible for the purpose of maximizing the magnetic propulsion force in the tracking direction. Each of the magnets 5a, 5b for the focusing coil 3 has a horizontally-long shape because of the laser-beam passage indentation 20 provided in the objective lens holder for the two objective lenses as described earlier. The magnets 5a, 5b for the focusing coil 3 are arranged in point-symmetric positions with respect to the geometric center 2a of the objective lens holder 2. The magnets 5a, 5b and 6a, 6b, 6c, 6d are arranged point-symmetrically with respect to the geometric center 2a of the objective lens holder 2 so as to surround the objective lenses 1a, 1b.

FIG. 6 shows acceleration sensitivity of the movable section based on a position of the magnetic-propulsion effective region 3a of the focusing coil 3 in the direction of the gap between the focusing coil and the magnet 5a, 5b under the condition that two objective lenses are used. The gap direction refers to the direction Δx shown in FIG. 5.

Figure 9:
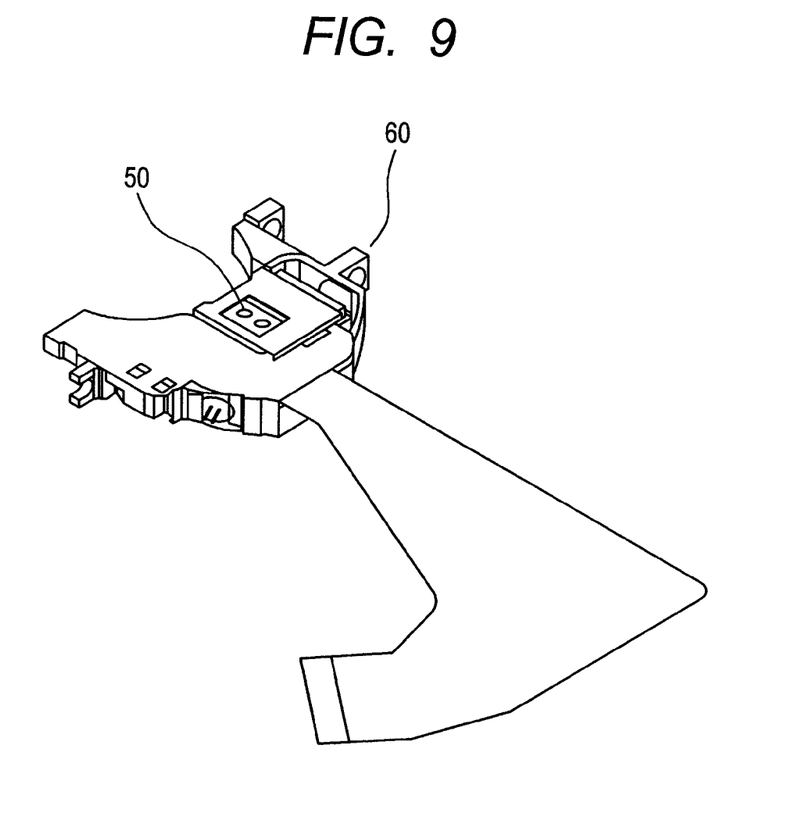
FIG. 9 is a diagram of an objective lens drive device according to the embodiments of the present invention mounted on an optical pickup.

A location of a focusing coil in the related art does not offer satisfied acceleration sensitivity required to support faster multi-speed. On the other hand, as in the first embodiment, the placement of the magnet-facing face of the focusing coil 3 within a range defined by the thickness Tf-tb of the tracking coil 4a, 4b results in a decrease in the distance between the magnet and the magnetic-propulsion effective region 3a of the focusing coil 3. This makes it possible to provide acceleration sensitivity sufficient to support faster multi-speed. The objective lens drive device 50 structured in this manner is secured to the optical pickup 60 through adjustment process as illustrated in FIG. 9.

Figure 10:
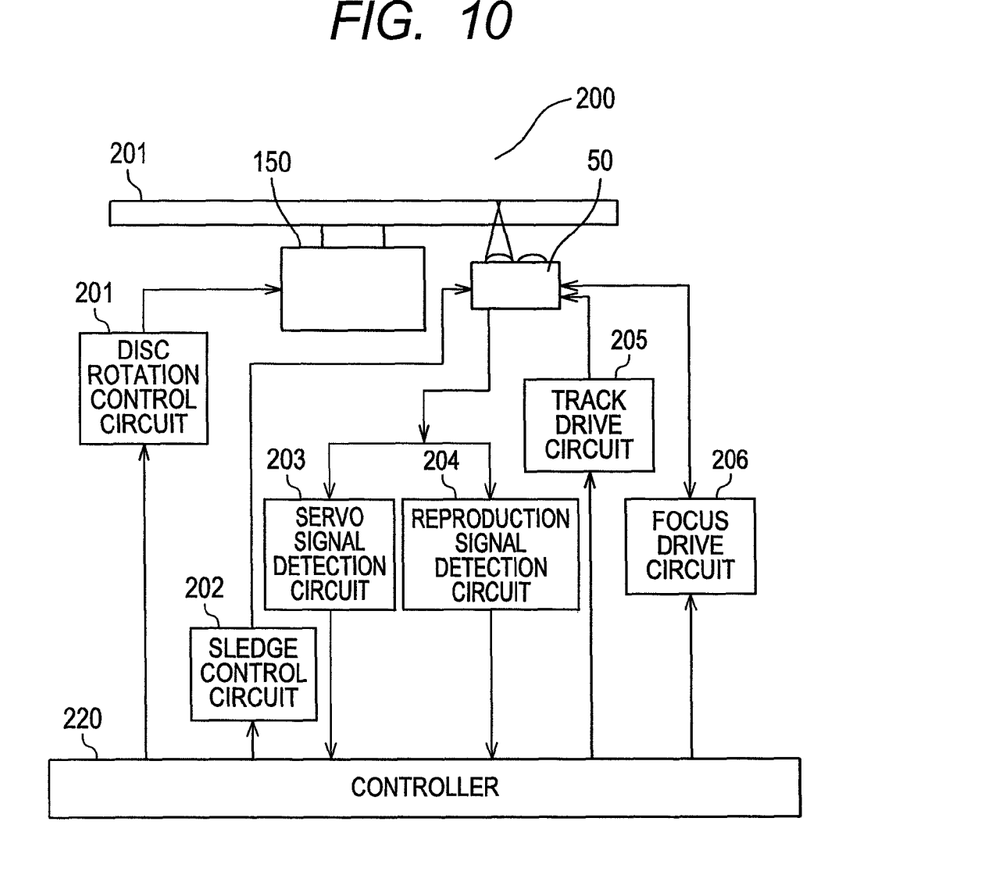
FIG. 10 is a block diagram generally illustrating an optical disc device.

Operation of the optical disc device is described with reference to FIG. 10.

The user loads an optical disc 210 in an optical disc device 200 installed in a personal computer or the like, for backing up data to the optical disc 210 or reading data from the optical disc 210. Then, the optical disc 210 is rotated by a disc rotation control circuit 201 mounted in the spindle motor 150 for rotation drive. At approximately the same time, an optical pickup 50 applies a laser to the surface of the optical disc 210 in order to recording/reproducing information on/from the data surface of the optical disc 210.

The optical pickup 50 uses a servo signal detection circuit 203 and a focusing drive circuit 206 to perform focusing operation on signals transmitted from an optical detection circuit and the objective lens drive device mounted on the optical pickup 50 such that the laser emitted from the objective lens is focused on the surface of the optical disc 210. Then, to make alignment with a track on the data surface of the optical disc 210, the optical pickup 50 uses the servo signal detection circuit 203 and a tracking drive circuit 205 to perform tacking operation as in the focusing operation.

In this manner, in the laser alignment process, the optical disc device 200 rotates the optical disc at high speed such that a data transfer rate reaches a predetermined rate, then generates data from reproduction signals from the optical pickup at the reproduction signal detection circuit 204. Then, the optical disc device 20 transmits/receives data to/from the personal computer through a controller 220. A sledge control circuit 202 exercises control of the optical pickup 50 in the radial direction of the optical disc 210. With the above-described operations, the user manipulates the data on the optical disc.

An optical disc does not always have a flat and smooth data surface or a true-circle data track. In addition, when the optical disc is loaded on the spindle motor in the optical disc device, the geometric center of the optical disc does not always align with a rotation center of the spindle motor. Accordingly, upon rotation of the optical disc, the data on the optical disc wobbles in the out-of-plane direction and the in-plane direction. This wobble seems vibration with acceleration when viewed from the optical pickup. In the optical pickup, the objective lens drive device is equipped with an acceleration generation mechanism including the magnets and the coils, in order to cause a laser focused spot to follow the data on the optical disc in step with the above-described vibrations. Regarding data vibration in the out-of-plane direction of the optical disc, since the vibration direction is the focal point, the coil is called a focusing coil. Also, regarding data track vibration in the in-plane direction of the optical disc, since the vibration direction is a radial direction of the optical disk, that is, a data track direction, the coil is called a tracking coil. Thus, during optical-disc data passing in the optical disc, the objective lens drive device in the optical pickup applies voltage to each of the coils at all times for optical spot control, and then drives the objective lenses while generating acceleration in order to follow data track on the optical disc.

By structuring the objective lens drive device according to the first embodiment as described above, an optical pickup adapted to a ultra-thin type and high acceleration sensitivity can be achieved, Second Embodiment A second embodiment according to the present invention is described with reference to FIGS. 7, 8, 9.

Figure 7:
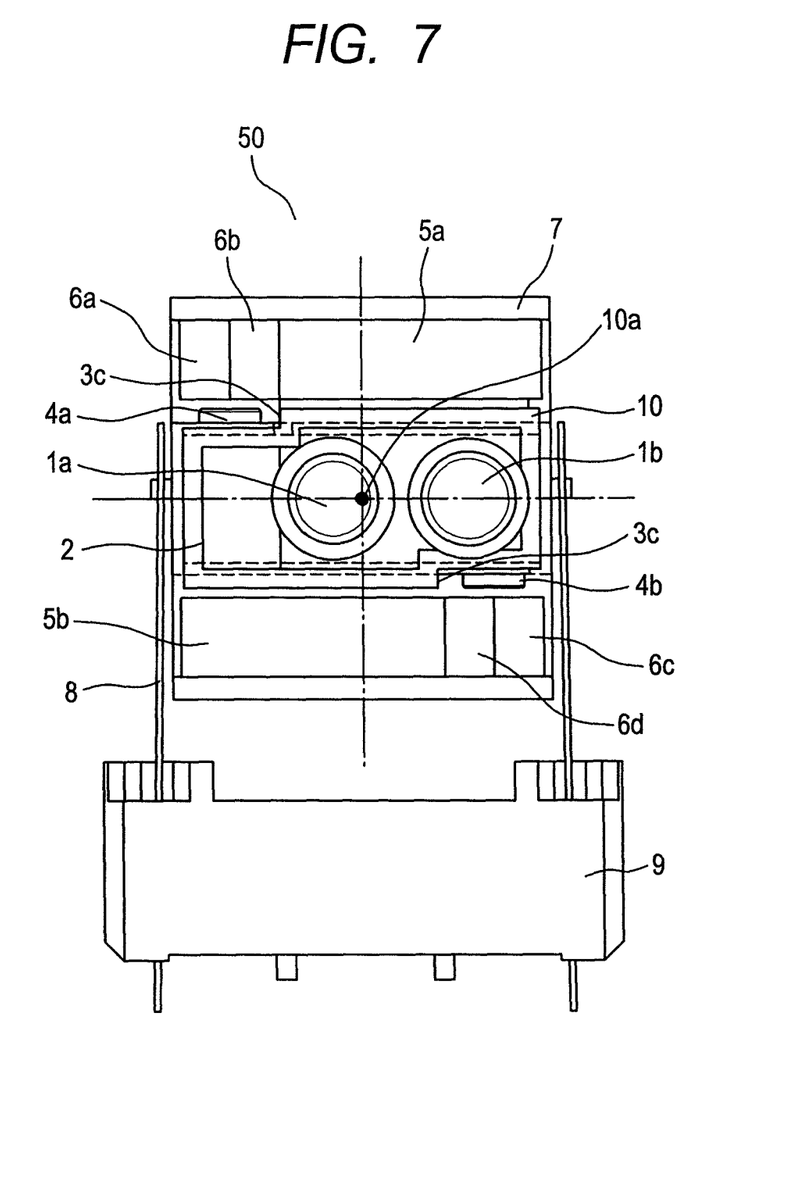
FIG. 7 is a top view illustrating a second embodiment according to the present invention.

FIG. 7 is a top view of the second embodiment.

Figure 8:
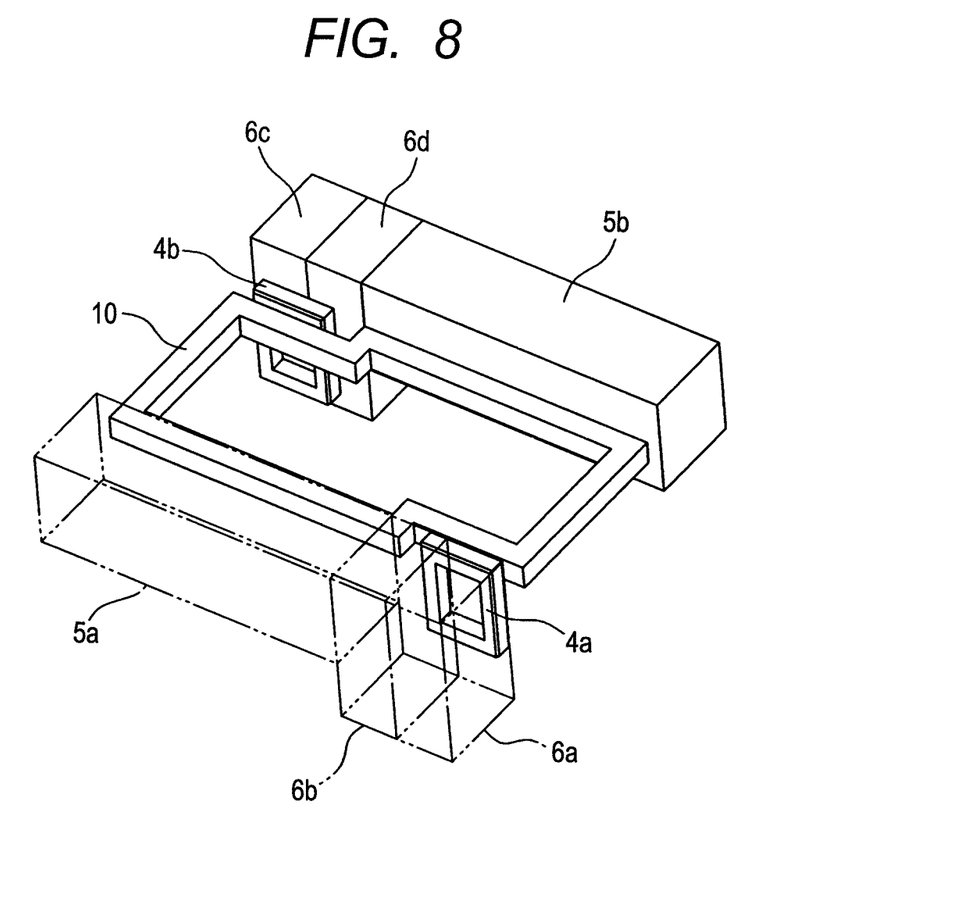
FIG. 8 is a perspective view illustrating a positional relationship between magnets and coils according to the second embodiment of the present invention.

FIG. 8 is a perspective view illustrating a positional relationship between magnets and coils according to the second embodiment.

FIG. 9 is a diagram of an objective lens drive device mounted on an optical pickup, according to the second embodiment.

A feature of the second embodiment is that a focusing coil mounted in the objective lens drive device has a portion close to a tracking coil formed in a rectangular shape. The second embodiment will be described below.

The same reference numerals denote the same component as those in the first embodiment, and the description is omitted.

In each diagram, the coil shape and the magnet placement, which are characteristic configuration according to the second embodiment, will be described. The tracking coils 4a, 4b are attached, as a pair of coils, in point-symmetric positions with respect to the geometric center of the objective lens holder 2, within the projection planes when viewed from the laser incidence side for the purpose of avoiding the laser-beam passage indentation 20. A focusing coil 10 is wound around the objective lens holder 2. Also, the focusing coil 10 has rectangular-shaped changed-level stages 3c formed in the vicinity to the mounting position of the tracking coils 4a, 4b for the purpose of avoiding the tracking coils 4a, 4b within the projection planes when viewed from the laser outgoing side.

A magnetic-propulsion effective region 3a of the focusing coil 10 is part of the focusing coil 10 extending parallel to the magnet surface. The focusing coil 10 is shaped to keep away from the optical apertures of the objective lenses 1a, 1b. A magnet-facing flat face of the magnetic-propulsion effective region 3a of the focusing coil 10 is located within a range corresponding to the thickness of the tracking coil 4a, 4b.

In a similar manner to the placement of the tracking coils 4a, 4b, the magnets 6a, 6b, 6c, 6d are placed opposite to the tracking coils 4a, 4b. Specifically, the magnets for the tracking coils 4a, 4b exist in point-symmetric positions with respect to the geometric center 2a of the objective lens holder 2. Also, each of the magnets has as large size in the focusing direction as possible for the purpose of maximizing the magnetic propulsion force in the tracking direction.

Each of the magnets 5a, 5b for the focusing coil 10 has a horizontally-long shape because of the laser-beam passage indentation 20 provided in the objective lens holder for the two objective lenses as described earlier. The magnets 5a, 5b for the focusing coil 10 are arranged in point-symmetric positions with respect to the geometric center 2a of the objective lens holder 2. The magnets 5a, 5b and 6a, 6b, 6c, 6d are arranged point-symmetrically with respect to the geometric center 2a of the objective lens holder 2 so as to surround the objective lenses 1a, 1b.

The objective lens drive device 50 structured in this manner is secured to the optical pickup 60 through adjustment process as illustrated in FIG. 9.

According to the second embodiment as described above, since it is possible to further increase the magnetic propulsion in the focusing direction, an objective lens drive device adapted to a ultra-thin type and high acceleration sensitivity can be achieved, and if this is mounted in an optical pickup, a high-performance optical pickup can be achieved. For this achievement:

1. An objective lens drive device comprises objective lenses guiding light emitted from a light emitting element to a disc surface; a holder in which the objective lenses are mounted; a focusing coil wound around the holder; a tracking coil attached in the vicinity of the focusing coil; and magnets for operating the focusing coil and the tracking coil, wherein spaces are provided in the focusing coil for placing the tracking coils.

2. The space in the focusing coil is provided by a changed-level stage formed as an inclined portion.

3. The space in the focusing coil is provided by a rectangular-shaped changed-level stage.

4. The two tracking coils are placed on diagonal portions of the holder.

5. A magnet-facing face of the focusing coil is flush with a magnet-facing face of the tracking coil.

6. The changed-level stage provided in the focusing coil has a depth greater than a thickness of the tracking coil.

It should be understood by those skilled in the art that various modifications, combinations, sub-combinations and alterations may occur depending on design requirements and other factors insofar as they are within the scope of the appended claims of the equivalent thereof.

What is claimed is:

1. An objective lens drive device, comprising:
   objective lenses guiding light emitted from a light emitting element to a disc surface;
   a holder in which the objective lenses are mounted;
   a focusing coil wound around the holder;
   a tracking coil attached in the vicinity of the focusing coil; and
   magnets for operating the focusing coil and the tracking coil, wherein:
   a magnet-facing face of the focusing coil includes a part extending parallel to a surface of at least one of the magnets which creates a magnetic-propulsion effective range for moving the focusing coil, and
   a space is provided in the focusing coil for placing the tracking coil.

2. The objective lens drive device according to claim 1, wherein a plurality of the tracking coils and a plurality of the spaces are provided, wherein each of the spaces in the focusing coil is provided by a changed-level stage formed as an inclined portion.

3. The objective lens drive device comprising:
   objective lenses guiding light emitted from a light emitting element to a disc surface;
   a holder in which the objective lenses are mounted;
   a focusing coil wound around the holder;

tracking coils attached in the vicinity of the focusing coil; and magnets for operating the focusing coil and the tracking coil, wherein:

spaces provided in the focusing coil for placing the tracking coils, wherein each of the spaces in the focusing coil is provided by a rectangular-shaped changed-level stage.

4. The objective lens drive device according to claim 1, wherein two of the tracking coils are provided and placed on diagonal portions of the holder.

5. The objective lens drive device according to claim 1, wherein the magnet-facing face of the focusing coil is flush with a magnet-facing face of the tracking coil.

6. The objective lens drive device comprising:

objective lenses guiding light emitted from a light emitting element to a disc surface;

a holder in which the objective lenses are mounted;

a focusing coil wound around the holder;

a tracking coil attached in the vicinity of the focusing coil; and magnets for operating the focusing coil and the tracking coil, wherein:

a space is provided in the focusing coil for placing the tracking coil, wherein a changed-level stage provided in the focusing coil has a depth greater than a thickness of the tracking coil.

7. An optical pickup, comprising the objective lens drive device according to claim 1.

8. An optical pickup, comprising the objective lens drive device according to claim 2.

9. An optical pickup, comprising the objective lens drive device according to claim 3.

10. An optical pickup, comprising the objective lens drive device according to claim 4.

11. An optical pickup, comprising the objective lens drive device according to claim 5.

12. An optical pickup, comprising the objective lens drive device according to claim 6.

13. The objective lens drive device according to claim 1, wherein a plurality of the tracking coils are provided and attached in the vicinity of the focusing coil, and wherein a plurality of spaces are provided in the focusing coil for placing the plurality of tracking coils.

14. The objective lens drive device according to claim 1, wherein the part of the focusing coil extending parallel to the at least one of the magnets is located so that it is placed within the magnetic propulsion effective range and is spaced apart from the at least one magnet by a distance which falls within a range of distances defining a thickness of the tracking coil between a magnet facing surface of the tracking coil and an objective lenses-facing surface of the tracking coil.

15. The objective lens drive device according to claim 14, wherein the part of the focusing coil extending parallel to the at least one magnet is located closer to the objective lenses than the magnet facing surface of the tracking coil.

16. The objective lens drive device according to claim 13, wherein two of the spaces are provided on diagonal portions of the holder in the focusing coil, and wherein the focusing coil is configured such that parts facing the surfaces of the magnets, except parts provided with the spaces, are formed as the parts extending parallel to surfaces of the magnets.

* * * * *